Jan. 25, 1966   L. HÄKKÄ   3,230,996
ANTI-SKID MEANS FOR VEHICLE TIRES AND THE LIKE
Filed April 2, 1964

Inventor
Lennart Häkkä
by Michael S. Striker
Atty

United States Patent Office 3,230,996
Patented Jan. 25, 1966

3,230,996
ANTI-SKID MEANS FOR VEHICLE TIRES
AND THE LIKE
Lennart Häkkä, Helsinki, Finland, assignor to
Oy Kovametalli AB, Helsinki, Finland
Filed Apr. 2, 1964, Ser. No. 356,895
Claims priority, application Finland, Apr. 6, 1963,
666/63
6 Claims. (Cl. 152—210)

This invention relates to a stud-like anti-skid means adapted to be forced into a vehicle tire preferably provided with a closed hole for receiving the anti-skid means preferably having a tip-piece of hard metal. There are many kinds of anti-skid means of the stated kind on the market but all these prior art anti-skid means have in common the features that the body member of the anti-skid means carries one or more body encircling flanges. These flanges have for their object to prevent the anti-skid means from tilting when the vehicle is being driven. When the flanges encircle the body member, the tire material on both sides of the flanges and bearing against the body member will be kept apart. From this it follows that the said parts tend to bend and hence the stud is permitted to tilt and this is undesirable because it promotes wear of the stud.

This invention has for its object to provide a stud-like anti-skid means which more positively than heretofore ensures that the stud-like anti-skid means will not tilt when the vehicle is being driven. The novelty feature of the invention lies in that the body member carries body-member non-encircling projections such as arms, vanes and the like extending outwardly therefrom and arranged in one or more planes. It is of advantage that the projections in superposed planes are in stepped relation to each other. The projections are preferably shaped in the form of vanes at right angles to the axis of the body member and tapering from a maximum width at their ends near the body member to a minimum width at their tip ends. Because the projection of the anti-skid means of the invention do not encircle the body member there will not, when the anti-skid means is embedded in the tire, be formed about the anti-skid means such annular tire portions which by their outer edges only are integral with the tire material but about the anti-skid means will be formed such tire portions integral with each other also between the vanes. For this reason the said portions are almost completely prevented from bending, from which in its turn follows that the anti-skid means also is prevented from tilting when the vehicle is being driven. The invention will be described more in detail with reference to embodiments shown in the accompanying drawings.

Figure 1:
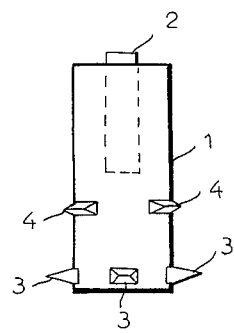
FIG. 1 is a side view of an anti-skid means of the invention.
Figure 2:
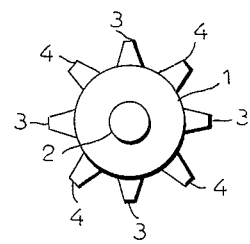
FIG. 2 is an end view of the said means.

The anti-skid means shown in FIGS. 1 and 2 includes a cylindrical body member 1, a hard metal tip-piece being provided at the one end of said body. On two planes the body member carries outwardly extending vanes 3, 4, respectively. One of the said two planes is located near to that end of the body member which is forced into the tire material while the other plane is located at the middle of the body member or on either side of the said middle. On each of the two planes there are four vanes spaced equidistant apart and the vanes on the different planes are in stepped relation to each other, as shown in FIG. 1. The vanes are at right angles to the axis of the body member 1 and the said vanes taper from a maximum width at their ends close to the body member to a minimum width at their tip ends.

Figure 3:
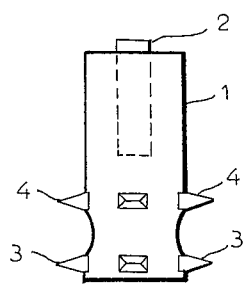
FIG. 3 is a side view of another form of anti-skid means of the invention.
Figure 4:
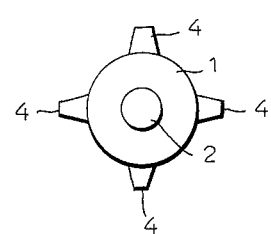
FIG. 4 is an end view of the anti-skid means shown in FIG. 3.

The anti-skid means shown in FIG. 3 includes a body member 1 provided with a hard metal tip piece 2 and carrying on two different planes also two sets of four outwardly extending vanes 3, 4 similar to the vanes in the preceding form of anti-skid means of the invention. The only difference is in that the vanes 3, 4 on the two planes are alined.

When the body member of the anti-skid means only carries projections that do not encircle continuously the body member 1 of the anti-skid means and when this anti-skid means is embedded in the tire, such portions integral with the tire material by their outer edges only cannot be formed on the top and bottom sides of the projections for the said portions at the sides thereof are of one piece with the tire material, from which it follows that the portions bearing against the top and bottom sides of the projections will not be so loose as to permit the tilting of the anti-skid means within the tire when the vehicle is being driven. This brings about the advantage that the service life of the anti-skid means will be longer than heretofore.

It is understood that the invention is not limited to the hereinabove described embodiment for the same may be modified in many different ways within the scope and spirit of the invention. So, e.g., the vanes may be shaped to have a form other than the one described and the vanes may be carried on more than two planes and, moreover, the number of vanes on each plane may be varied as desired. Also the distance and location of the planes relative to the body member may be other than that hereinabove described.

I claim:

1. Anti-skid means adapted to be at least partially inserted into a bore of a predetermined diameter provided in a vehicle tire and the like, said anti-skid means comprising, in combination, an elongated, substantially cylindrical body member having a diameter at least equal to said predetermined diameter of said bore; and a plurality of rigid holding projections integral with said body member and circumferentially spaced thereabout, said holding projections being arranged in at least two longitudinally spaced transversal planes each substantially normal to the direction of elongation of said body member, said holding projections having respective free ends spaced from said member and tapering in thickness in the direction of said free ends so that, when said anti-skid means is inserted into a vehicle tire, the material of said tire will intimately surround said projections and engage said body member intermediate the projections whereby tilting of said anti-skid means and destructive leverage action of the same on said tire material are substantially prevented.

2. Anti-skid means as defined in claim 1 wherein said holding projections in the respective planes are arranged about said body member with substantially equal circumferential spacing and the projections in the respective planes are aligned with one another.

3. Anti-skid means as defined in claim 1, wherein said holding projections in the respective planes are arranged about said body member with substantially equal circumferential spacing and the projections in one plane are circumferentially staggered relative to the projections in the other plane.

4. Anti-skid means as defined in claim 1, further comprising wear-resistant tip means at the road-engaging free end of said body member.

5. Anti-skid means as defined in claim 1 wherein said body member has a rear end, a road-engaging front end, and a middle, and wherein said holding projections are arranged in two planes normal to said body member intermediate said middle and said rear end thereof.

6. Anti-skid means adapted to be at least partially inserted into a bore provided in a vehicle tire and the like and comprising, in combination, an elongated stud-like body member of a given diameter; and a plurality of integral rigid projections extending substantially normal to the direction of elongation of said body member and arranged in at least two longitudinally spaced planes, said projections in the respective planes being substantially evenly distributed about the circumference of said body member, said projections further having free ends and being of a length less than said diameter of the body member and tapering in thickness toward their respective free ends so that, when said anti-skid means is inserted into said bore, said projections will become completely embedded in the material of the tire and said material will intimately surround said projections and engage said body intermediate the same so that said anti-skid means is reliably prevented from tilting movements.

References Cited by the Examiner

UNITED STATES PATENTS

| 2,460,003 | 1/1949 | Gemeny | 152—210 |
| 2,652,876 | 9/1953 | Eisner | 152—210 |
| 3,125,147 | 3/1964 | Hakka | 152—210 |

FOREIGN PATENTS

| 3,256 | 1913 | Great Britain. |
| 3,257 | 1913 | Great Britain. |
| 1,299,747 | 6/1961 | France. |

ARTHUR L. LA POINT, *Primary Examiner.*